United States Patent
Calo et al.

(10) Patent No.: US 9,019,971 B2
(45) Date of Patent: *Apr. 28, 2015

(54) SYSTEMS, METHODS AND ALGORITHMS FOR NAMED DATA NETWORK ROUTING WITH PATH LABELING

(75) Inventors: Seraphin Calo, Cortlandt Manor, NY (US); Raheleh B. Dilmaghani, Elmsford, NY (US); Bong Jun Ko, Harrington Park, NJ (US); Kang-Won Lee, Nanuet, NY (US); Vasileios Pappas, Elmsford, NY (US); Ramya Raghavendra, White Plains, NY (US); Yang Song, Ossining, NY (US); Dinesh Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 13/589,619

(22) Filed: Aug. 20, 2012

(65) Prior Publication Data

US 2014/0023076 A1     Jan. 23, 2014

Related U.S. Application Data

(63) Continuation of application No. 13/554,554, filed on Jul. 20, 2012.

(51) Int. Cl.
*H04L 12/28* (2006.01)
*H04L 12/721* (2013.01)
*H04L 12/725* (2013.01)

(52) U.S. Cl.
CPC .............. *H04L 45/38* (2013.01); *H04L 45/306* (2013.01); *H04L 45/34* (2013.01)

(58) Field of Classification Search
CPC ................... H04L 49/3009; H04L 2012/5618
USPC ............. 370/241.1, 230, 392, 401, 352, 400, 370/351
See application file for complete search history.

(56) References Cited

U.S. PATENT DOCUMENTS

| | | |
|---|---|---|
| 6,484,204 B1 | 11/2002 | Rabinovich |
| 6,563,454 B2 | 5/2003 | Akasu |
| 7,339,937 B2 | 3/2008 | Mitra et al. |

(Continued)

OTHER PUBLICATIONS

DiMarco, TT. et al., "Use of Alias Names to Reference Objects", IP.com, Mar. 30, 2005, pp. 297-302.

(Continued)

*Primary Examiner* — Chandrahas Patel
(74) *Attorney, Agent, or Firm* — Scully, Scott, Murphy & Presser, P.C.; Preston J. Young, Esq.

(57) ABSTRACT

A computer-implemented system and computer program product for routing at least one interest packet in a named data network including a plurality of nodes. The system comprises a mapping unit configured for mapping each of a plurality of names of a respective plurality of the data objects to one of a plurality of path labels, wherein each path label uniquely identifies a path between a source node and a destination node; and a node in operative communication with the mapping unit configured for providing an interest packet having both the name of a requested data object and one of the path labels, wherein the path label provided with the interest packet points to the requested data object at the destination node of the path label provided with the interest packet.

18 Claims, 6 Drawing Sheets

(56) References Cited

U.S. PATENT DOCUMENTS

| | | | |
|---|---|---|---|
| 8,224,361 B2 | 7/2012 | Timmons et al. | |
| 8,472,415 B2 | 6/2013 | Yegani et al. | |
| 8,537,827 B2 * | 9/2013 | Okamoto | 370/392 |
| 2006/0165053 A1 | 7/2006 | Bhatnagar et al. | |
| 2007/0067280 A1 | 3/2007 | Zhou et al. | |
| 2008/0183774 A1 | 7/2008 | Otani et al. | |
| 2009/0192996 A1 | 7/2009 | Guo et al. | |
| 2009/0287835 A1 | 11/2009 | Jacobson | |

OTHER PUBLICATIONS

Spelce, DC. et al., "Method for Browsing Aliases and Network Names", IP.com, Mar. 30, 2005, pp. 51-52.

Alimi, R. et al., "A Survey of In-Network Storage Systems", IP.com, Dec. 4, 2011, pp. 1-44.

Song, Y. et al., "Power-aware Traffic Engineering with Named Data Networking", Mobile Ad-hoc and Sensor Networks (MSN), 2011 Seventh International Conference, Dec. 16-18, 2011, pp. 289-296.

* cited by examiner

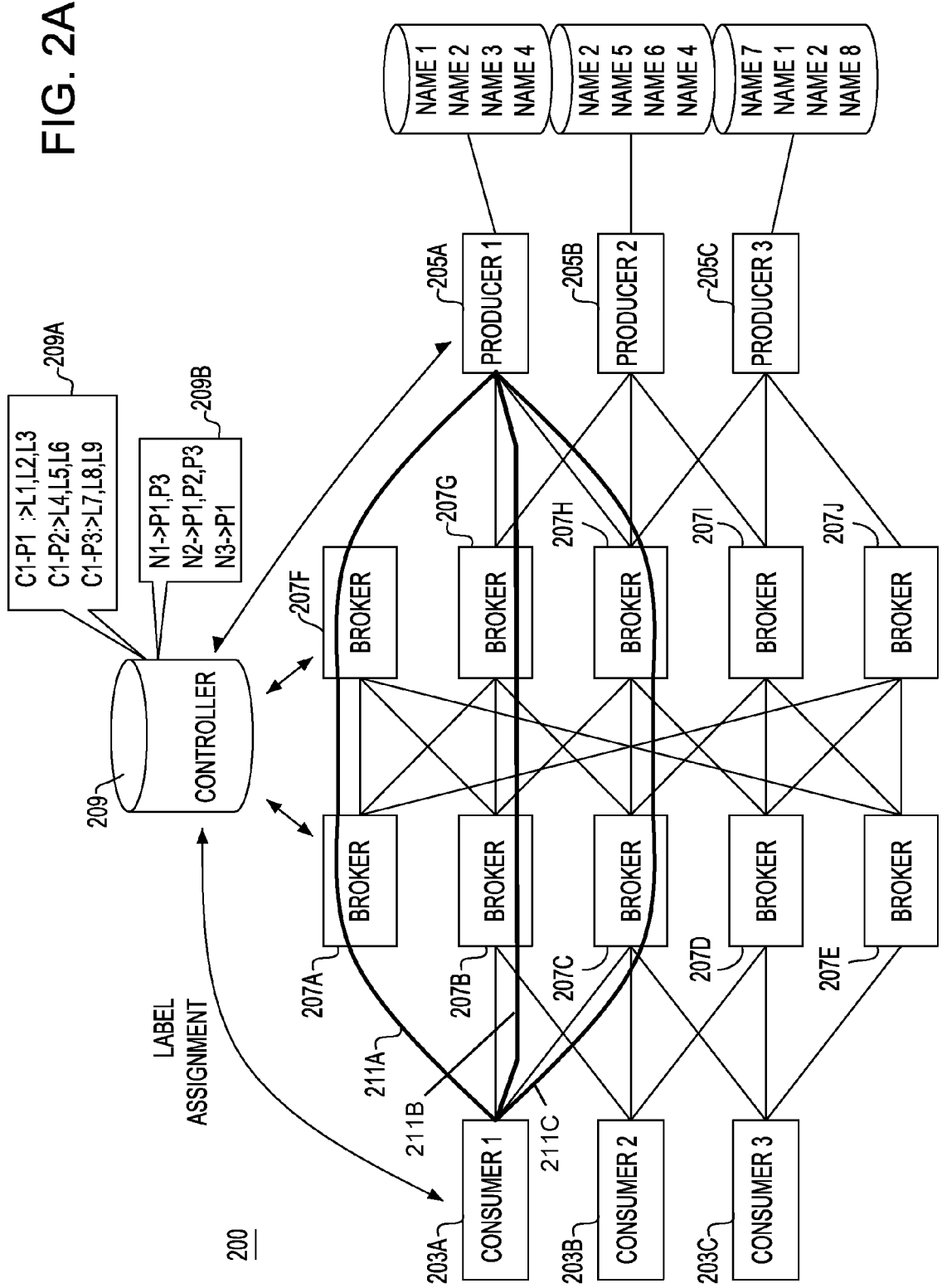

SYSTEMS, METHODS AND ALGORITHMS FOR NAMED DATA NETWORK ROUTING WITH PATH LABELING

RELATED APPLICATION

This application is a continuation of U.S. Ser. No. 13/554,554, filed Jul. 20, 2012, the entire contents of which are incorporated herein by reference.

BACKGROUND

The present disclosure relates generally to the field of routing of interest packets, response packets and/or data objects over networks using path labeling (in named data networks).

In various examples, routing with path labeling may be implemented in one or more named data networks in the form of systems, methods and/or algorithms.

DESCRIPTION OF RELATED ART

In conventional domain name server ("DNS") mapping between names and destination addresses, the DNS can map an address name to an IP address and as such, a URL name can be mapped to a destination IP address based on DNS.

In conventional router forwarding based on multi-protocol label switching (MPLS), an MPLS label can encode a path from a source router to a destination router and as such, it can be used to route a packet from one network to another (customer networks) using a predetermined path within a third network (provider network).

Routing of packets in conventional datacenters is typically done based on the IP/MAC addresses of destination nodes.

Named data networking (sometimes referred to herein as "NDN") is a paradigm in which data object requests (e.g., from a consumer or broker) are routed to a data entity (or data object) using a name such as, for example, alphanumeric characters (in contrast to machine addresses in traditional IP networks). In the NDN paradigm, a user (or consumer) requests a named data object from a data producer (such a request is sometimes called "interest"). The user's request is forwarded towards the data producer by one or more routers (possibly through one or more NDN brokers) based on the name of the data object in the request. The data producer then responds with the requested data object.

FIG. 1 shows an example of a conventional named data networking architecture 100. As seen in this example, consumers 101A, 101B and 101C interact with producers 103A, 103B and 103C via brokers 105A, 105B, 105C, 105D, 105E, 105F, 105G and/or 105H.

Still referring to FIG. 1, communication (e.g., requests, responses, data objects) between and among the various entities (indicated by the solid lines between the entities) may be bi-directional. Further, the communication may be carried out via the Internet, an intranet, a local area network, a wide area network and/or any other desired communication channel(s).

Of note, while FIG. 1 shows the various entities communicating, it is to be understood that this FIG. 1 is actually referring to communication by computer system(s) or the like that are owned, leased, operated, used by, in the possession of and/or controlled by each of the entities.

As described above, in a datacenter architecture based on named data networking, routing is done based on the name of the requested data object instead of host identifiers (e.g., IP addresses, MAC address), an approach that decouples the location of the data object from routing (data can be located independently of various hosts, which facilitates mobility and multipath routing). In addition, data objects can be cached in intermediate nodes, which can reduce or eliminate hotspots due to very popular data.

However, the NDN approach of routing based on names does not scale the same way as the traditional approach of networking based on address, given that the number of names is typically orders of magnitude larger than the number of destinations in a datacenter. In addition, NDN routing tables are huge while switch memory is limited (the number of named data objects in a datacenter is orders of magnitude larger than number of hosts (typically more than a billion names vs less than a million hosts)). Further, NDN route lookups are typically slow (forwarding requires a longest prefix matching on names, compared to MAC based forwarding that requires an exact matching). Further still, NDN forwarding typically "floods" the network (packets for names that do not have any forwarding entries that can lead to "flooding" in all outgoing interfaces, similar to ethernet MAC learning process).

SUMMARY

The present disclosure relates generally to the field of routing with path labeling (in named data networks).

In various examples, routing with path labeling may be implemented in one or more named data networks in the form of systems, methods and/or algorithms.

In one embodiment, a method implemented in a computer system for routing at least one interest packet in a named data network including a plurality of nodes is provided, the method comprising: mapping, with the computer system, each of a plurality of names of a respective plurality of data objects to one of a plurality of path labels, wherein each path label uniquely identifies a path between a source node and a destination node; and providing, with the computer system, an interest packet having both the name of a requested data object and one of the path labels, wherein the path label provided with the interest packet points to the requested data object at the destination node of the path label provided with the interest packet.

In another embodiment, a computer readable storage medium, tangibly embodying a program of instructions executable by the computer for routing at least one interest packet in a named data network including a plurality of nodes is provided, the program of instructions, when executing, performing the following steps: mapping each of a plurality of names of a respective plurality of data objects to one of a plurality of path labels, wherein each path label uniquely identifies a path between a source node and a destination node; and providing an interest packet having both the name of a requested data object and one of the path labels, wherein the path label provided with the interest packet points to the requested data object at the destination node of the path label provided with the interest packet.

In another embodiment, a computer-implemented system for routing at least one interest packet in a named data network including a plurality of nodes is provided, the system comprising: a mapping unit configured for mapping each of a plurality of names of a respective plurality of the data objects to one of a plurality of path labels, wherein each path label uniquely identifies a path between a source node and a destination node; and a node in operative communication with the mapping unit configured for providing an interest packet having both the name of a requested data object and one of the path labels, wherein the path label provided with the interest packet points to the requested data object at the destination node of the path label provided with the interest packet.

BRIEF DESCRIPTION OF THE DRAWINGS

Various objects, features and advantages of the present invention will become apparent to one skilled in the art, in view of the following detailed description taken in combination with the attached drawings, in which:

FIG. 2A depicts a block diagram of a system according to an embodiment of the present invention.

DETAILED DESCRIPTION

Figure 1:
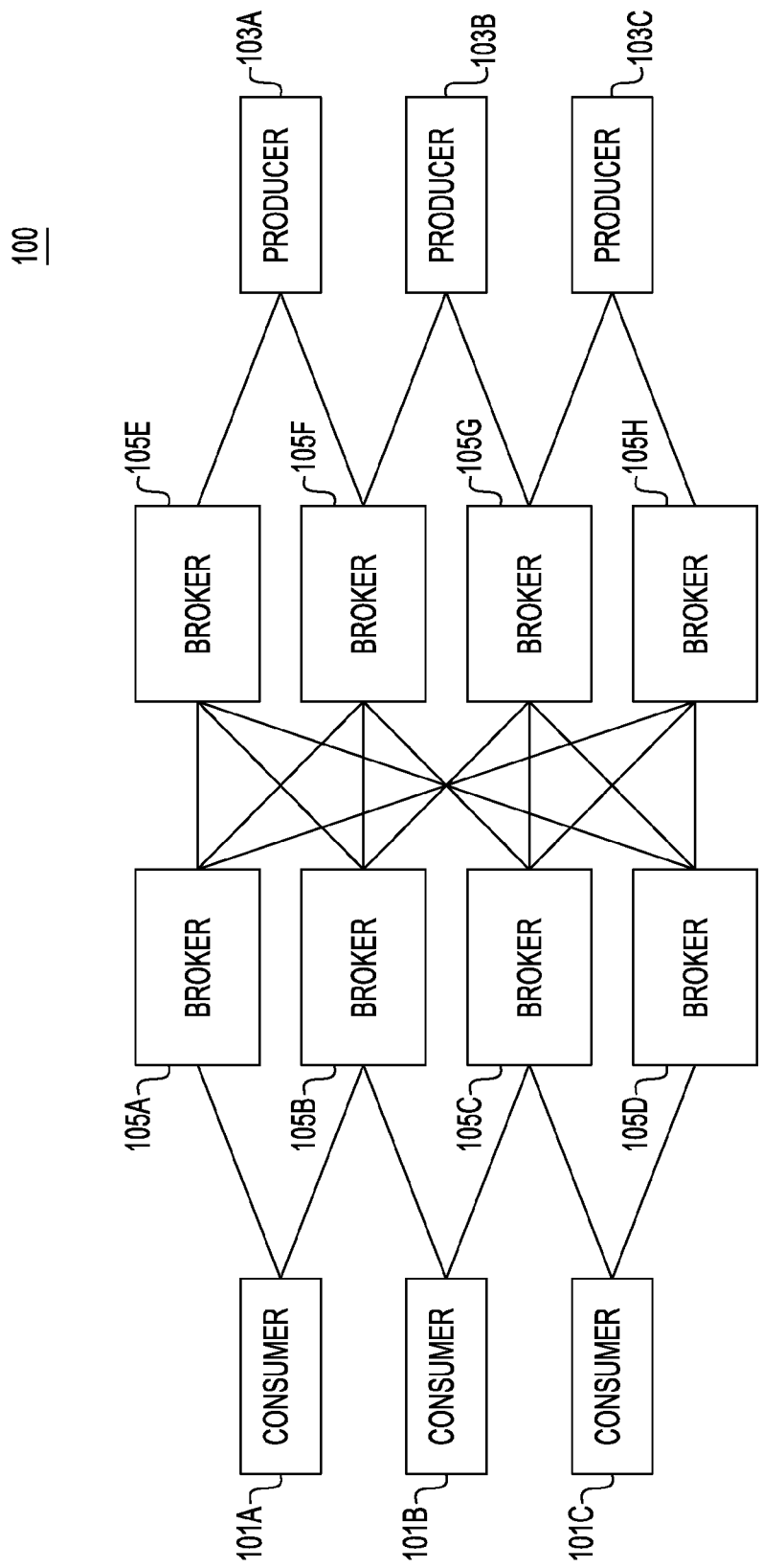
FIG. 1 depicts a block diagram of a conventional named data architecture.

For the purposes of description, the term "data object" is intended to refer to a sequence of bytes of a given length. For example, a data object can be a segment of a file, or a file, or a collection of files, or a sequence of bytes that is dynamically generated.

For the purposes of description, the term "node" is intended to refer to a router, a switch, a client and/or a server.

For the purposes of description, the term "link" is intended to refer a direct connection between two nodes, i.e. a connection between two nodes that does not involve any other node. A link can be a physical layer link, e.g. an Ethernet link, a network layer link, e.g. an IP tunnel, or a transport layer link, e.g. a TCP connection, or any other type of connection that does not have any NDN component in-between.

For the purposes of description, the term "random" or "randomly" is intended to refer to being actually random or pseudo-random (e.g., such as may typically be obtained using a computer system).

For the purposes of description, the term "hotspots" is intended to refer to points of congestion that typically occur in datacenter networks due to differences in the frequency of access for different data objects residing on different servers.

For the purposes of description, the term "incoming interface" is intended to refer to a node interface that receives a packet sent from a neighbor node.

For the purposes of description, the term "outgoing interface" is intended to refer to a node interface that forwards a packet to a neighbor node.

For the purposes of description, the term "flood" or "flooding" is intended to refer to the processes, implemented within a network node, where one packet received from an incoming interface is replicated and forwarded to all the interfaces of the network node, other than the incoming interface. In a different definition, the flooding process may replicate and forward the packet only to a limited set of interfaces (least two interfaces), other than the incoming interface.

For the purposes of description, the term "namespace branch" is intended to refer to a sub-space of the namespace where all names have a common property, e.g. all names have the same prefix.

For the purposes of description, the term "datacenter" or "datacenter network" is intended to refer to a subset of all possible networks. For example, a datacenter network can be a network that interconnects a set of servers with each other and with the Internet.

As described herein, mechanisms for specifying one or more predefined paths for routing an interest packet for a given named data object in the context of a named data networking environment are provided. In one specific example, the name of the data object may be mapped to a path label that uniquely identifies a path between a source node and a destination node. Further, in one specific example, the interest packet (containing the path label in addition to the name of the data object) may be forwarded (e.g., to a next hop) based on path information provided by the path label.

Reference will now be made to FIG. 2A, showing a system according to one embodiment. As seen in this FIG. 2A, a named data networking architecture is deployed in a datacenter. The various data objects are retrieved from producers based on their names rather than based on the destination addresses of the node(s) where the data objects are located.

In this embodiment, the networking architecture 200 utilizes the following set of system components to enable routing based on path labels:

(A) NDN Consumers 203A-203C. These are the nodes that request data objects, based on the names of the data objects. A request comes from a consumer to a producer in the form of an interest packet, which contains the name of the data object, and optionally any other fields/attributes related to: the data object, the consumer, the producer and/or the interest itself. Each of consumers 203A-203C may comprise a router, server and/or switch and may include therein a respective cache (not shown).

(B) NDN Producers 205A-205C. These are the nodes that have a set of data objects, and can respond back to interests generated by the consumers. A data object response contains the name of the data object, the data object itself, and optionally any other fields/attributes related to: the data object, the consumer, the producer and/or the interest that generated the response. In the example shown in FIG. 2, producer 205A has residing thereon named data objects 1, 2, 3 and 4; producer 205B has residing thereon named data objects 2, 5, 6, and 4; and producer 205C has residing thereon named data objects 7, 1, 2 and 8. Each of producers 205A-205C may comprise a router, server and/or switch and may include therein a respective cache (not shown).

(C) NDN Brokers 207A-207J. These are the nodes that forward interest packets from consumers to producers and response packets from producers to consumers. In various examples, forwarding interest/response packets is based on predefined labels, rather than based on names as in the "traditional" NDN style of forwarding. Each of brokers 207A-207J may comprise a router, server and/or switch and may include therein a respective cache (not shown).

(D) NDN Controller 209. These are the node(s) that provide the naming and routing service, which enable the mapping of names to path labels and which decide the possible path(s) that a data interest/response will follow. In various examples, a controller can be just one central node, or a cluster of nodes, or a set of consumer, producer and/or broker nodes. In another example, the controller(s) may be distributed. In another example, the controller(s) may be centralized. Further, in the example shown in FIG. 2, controller 209 has residing thereon path label table 209A and names table 209B. Each of the controller(s) may comprise a router, server and/or switch and may include therein a respective cache (not shown).

As seen, path labels table 209A specifies, in this non-limiting example: links L1, L2 and L3 between consumer 1 and producer 1; links L4, L5 and L6 between consumer 1 and producer 2; and links L7, L8 and L9 between consumer 1 and producer 3. Of note, in this example, all possible links are not depicted in the path labels table 209A, however, such configuration is possible. Of further note, for the purposes of illustration, only links L1, L2 and L3 are identified in the Fig. as call-out numbers 211A, 211B and 211C, respectively.

In addition, as seen, names table 209B specifies, in this non-limiting example: named data object 1 residing on producers 1 and 3; named data object 2 residing on producers 1, 2 and 3; and named data object 3 residing on producer 1. Of note, in this example, all named data objects are not depicted in the names table 209B, however, such configuration is possible.

Still referring to FIG. 2A, communication (e.g., requests, responses, data objects) between and among the various entities (indicated by the lines between the entities) may be bi-directional. Further, the communication may be carried out via the Internet, an intranet, a local area network, a wide area network and/or any other desired communication channel(s).

Figure 2B:
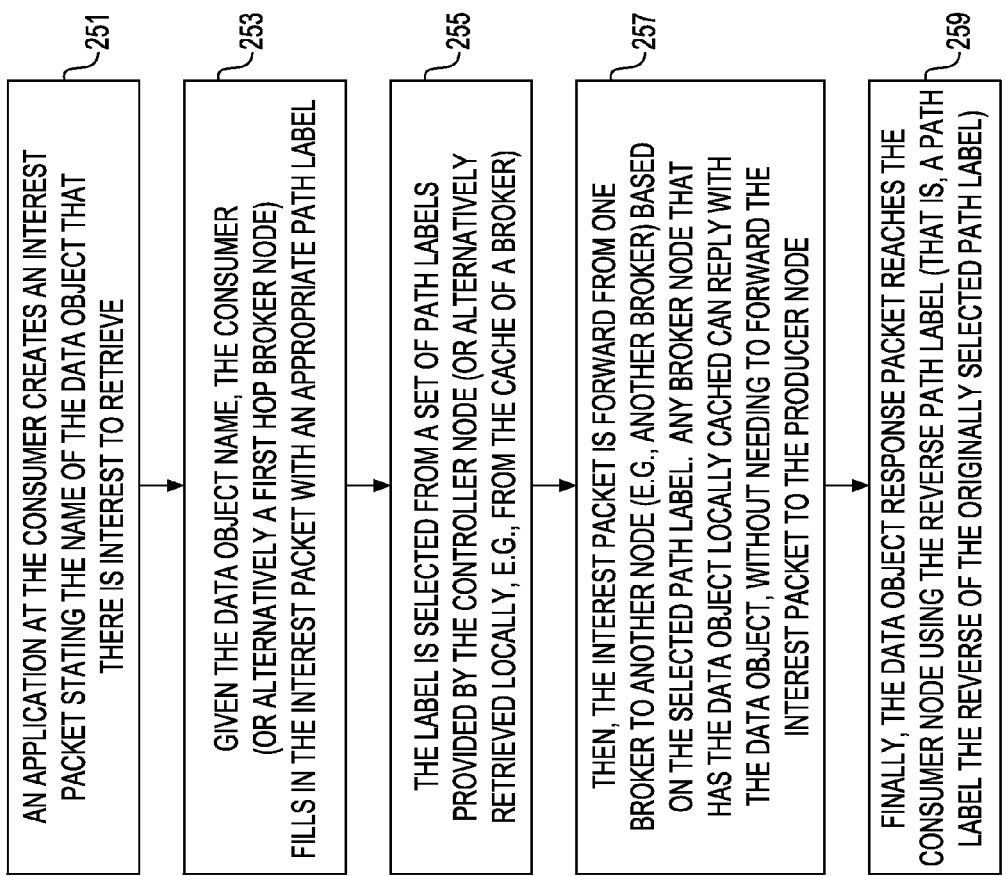
FIG. 2B depicts a flowchart of a method according to an embodiment of the present invention.

Referring now to FIG. 2B, an example data exchange between a consumer (e.g., consumer 203A of FIG. 2A) and a producer (e.g., producer 205A of FIG. 2A) proceeds as follow. First, (see Step 251) an application at the consumer 203A creates an interest packet stating the name of the data object that there is interest to retrieve. Given the data object name (see Step 253), the consumer 203A (or alternatively a first hop broker node, e.g., broker 207A) fills in the interest packet with an appropriate path label. The label is selected (see Step 255) from a set of path labels provided by the controller node 209 (or alternatively retrieved locally, e.g., from the cache of broker 207A). Then (see Step 257), the interest packet is forward from broker 207A to another node (e.g., broker 207F) based on the selected path label. Any broker node that has the data object locally cached can reply with the data object, without needing to forward the interest to the producer node (in this example, producer 205A). Finally (see Step 259), the data object response packet reaches the consumer node (in this example, consumer 203A) using the reverse path label (that is, a path label the reverse of the originally selected path label). Of note, the controller(s) may communicate bi-directionally with any one or more of the consumers, brokers and/or producers.

Reference will now be made to various mechanisms for performing names-to-labels-mapping in order to enable named data routing based on path labels in datacenters.

In one embodiment, the controller node(s) are responsible for mapping names to path labels, by having full knowledge of the location of the data objects (e.g., the controller node(s) know for each name all the producer(s) that have the related data objects). Whenever a producer node has a new data object ready to be consumed, or whenever it wants to indicate its ability to produce a new data object on demand, it registers with the controller the name of its data object. It can either register the exact name of the object or the namespace branch in which its data object belongs to. The controller node(s) also maintain an up-to-date network topology of the datacenter.

Knowledge about the location of the data objects may be achieved by having the producer(s) of the data objects notifying the controller node(s) about the creation of new data objects and conversely about the deletion of old data objects. This may be a one-time update operation, which can scale well (to the extent that the frequency of creation/deletion of new/old data objects does not overwhelm the controller node (s)). Given that dynamically created content (e.g., dynamically created data objects) can be responsible for most of these one-time update operations, the number of such one-time update operations may be reduced by lumping together a set of dynamically generated content (e.g. the content of one whole session) under the same branch of a namespace, and have the producer node register the creation/deletion of the whole namespace branch, rather than registering the individual pieces of data. In the case, the controller can do a longest prefix match on a name and find the producer(s) that have the branch of the namespace that contains the name.

In summary, as described for this embodiment, the controller node(s) may know the location of the data objects by having an exact mapping between a data object name and the producer(s) that have the data object and/or by doing a longest prefix matching between a data object name and a branch of the namespace that is registered by one or more producer(s).

Furthermore, the controller(s) may have an up-to-date knowledge of the network topology of the datacenter. This information can be retrieved by various mechanisms known to those of ordinary skill in the art. Given the network topology, the controller(s) may then create a list of possible paths between all pairs of consumers and producers. For a given pair of consumer and producer nodes, the possible paths can be, in this embodiment: (a) just one of the shortest paths between the two nodes, (b) all the equal distance shortest paths between the two nodes, (c) all paths of a distance no greater than X times the distance of the shortest path, (d) all disjoint paths between the two nodes, (e) all disjoint paths with equal distance to the shortest path, (f) all disjoint paths with a distance no greater than X times the distance of the shortest path, (g) all loop-free paths between the two nodes, and/or (h) any paths between the two nodes selected based on a well defined criterion, including a random selection of any number of paths that have some well defined properties. After creating all the paths between all pairs of nodes the controller (s) may then provide a unique label to each path. Various details regarding the labeling of the paths are provided below.

The controller(s) may occasionally need to re-compute the path labels (e.g., when changes occur in the datacenter network topology). In one embodiment, the controller(s) may employ a dynamic shortest path algorithm (e.g., all pairs shortest path of the type known to those of ordinary skill in the art, top-K shortest paths of the type known to those of ordinary skill in the art) in order to update the paths and path labels. In such a formulation, the brokers may form graph nodes and the links between the brokers may form edges of the network graph. A dynamic algorithm may compute all shortest paths in memory and/or maintain graph indices that can be updated dynamically when changes occur to the network topology.

Given their knowledge of data object locations and the possible paths between consumers and producers, the controller node(s) may provide the list of all possible paths that a consumer can use to reach any of the producer(s) that have the required data object(s). In one example, each controller node does not necessarily need to have the full knowledge of: (a) the whole namespace, (b) all the mappings between names or namespace branches to producers, or (c) all the paths between all pairs of consumer and producer nodes. Any of the above information can be apportioned and replicated across multiple controller nodes (e.g., in a consistent manner).

Reference will now be made to the assignment of a data object name to path label in an interest packet. Such assignment may be done, for example, in one or more of the following ways:

(A) Random—Given the list of all possible path labels between a consumer and producer(s), a path label is randomly assigned to an interest packet. This assignment strategy enables even distribution of traffic within a datacenter across all possible paths between consumers and producers.

(B) Consistent—Given the list of all possible path labels between a consumer and producer(s), a path label is assigned to an interest packet in a consistent pseudorandom manner. More specifically, for a given name and a given set of paths between consumer and producer(s), the selection process always chooses the same path label, while for different names and the same set of paths between consumer and producer(s) the section process returns different labels. This assignment strategy has certain traffic distribution benefits of the random assignment, while at the same time enables higher cache hit rates for popular objects.

(C) Hierarchical—Given the list of all possible path labels between a consumer and producer(s), a path label is assigned to an interest packet in a way that guarantees that the path includes one or more specified broker nodes for the given requested name. More specifically, given a data object name, an ordered list of broker nodes is identified in some well-defined manner. For example, this list can include all the broker nodes in a spanning tree rooted at one of the producer nodes of the data object. In a different example, this list can include all the nodes in spanning tress rooted at all the producer nodes of the data object. Then, given this list of broker nodes a path is selected based on the number of those nodes included in the path. For example, the path that includes the maximum number of nodes is selected. One benefit of this approach is that it enables spreading the load across the datacenter network while at the same time increases the hit rate of the cache for popular objects.

(D) Historical—Given the list of all possible path labels between a consumer and producer(s), a path label is assigned to an interest packet in a way that guarantees that the path includes one or more specified broker nodes that have been used before for the given requested name. This approach assumes that the controller node(s) maintain a history of the paths used for the various data object names in the datacenter. If for a given name there is no historical path information, e.g., it is the first time that the data object name is requested or the historical data for that data object name have been deleted, then one of the possible paths between the consumer and the producer may be selected at random. One benefit of this approach is that it enables spreading the load across the datacenter network while at the same time increases the hit rate of the cache for popular objects.

Reference will now be made to named data caching. In one embodiment, caching of data happens on the broker nodes as data object packets flow from the producers to the consumers. Broker nodes cache the data objects by storing them in volatile or non-volatile memory and by maintaining an index of the names that are locally cached and the data objects that these names refer to. These cached data objects can be used to reply directly to the consumers in the case that an interest packet flows through a broker node that happens to have the data object locally cached. To increase the chances of reaching cached data as soon as possible, one approach of path label forwarding using the consistent, hierarchical and historical routing protocols described above is to assign paths to an interest packet based on the data object name in the packet. Their basic principle is to converge all interest packets for a given name to the closest possible broker node.

Given that there is a limited capacity of the broker nodes to cache data, one can design a multilevel caching protocol may be implemented that caches the most popular data objects to the broker nodes closest to the consumers and the less popular data objects to the broker nodes furthest from the consumers. This can be achieved, for example, by providing a greater number of possible paths for the most popular names and a smaller number of possible paths for the least popular names. Then, any of the previously mentioned routing protocols that selects a path from the list of all possible paths (e.g., random, consistent, hierarchical or historical routing) can be used to assign a path label to a given interest packet.

Reference will now be made to path label forwarding. In one embodiment, after a path label has been assigned to an interest packet the interest packet is routed between the broker nodes based on the information encoded in the path label and the name of the data object that is requested. More specifically, once a broker node receives an interest packet, the broker node may check first if the data object of the requested name is already locally cached. If yes, the broker may reply with a data object packet following the reverse path of the encoded path in the label.

Reference will now be made to two examples of ways that the path information can be encoded in a path label:

(A) Forwarding Table—in this approach every possible path between a producer and a consumer is given a unique label. The label can be anything, e.g. a number, a string, etc. A broker node is then prepopulated with two forwarding tables related to the path labels that correspond to paths that go through that broker node. The first table, the interest forwarding table, provides a mapping between a path label and the next hop broker on the path between the consumer and the producer node that corresponds to that path label. The second table, the data forwarding table (or the reverse forwarding table), provides a mapping between a path label and the next hop broker on the path between the producer and the consumer node that corresponds to that path label.

(B) Source Routing—in this approach the path label encodes the exact path information as a sequence of broker node ID's (or alternatively as a sequence of link ID's). This approach assumes that brokers (and/or or links) have unique ID's. Once a broker node receives a packet the broker node searches for the packet's ID (or its link ID) and then the broker forwards the packet on to the next broker node (or the next link) that is identified by the subsequent ID in the path label. For optimization purposes, the path label can also include a counter that indicates the current node on the encoded path label, which eliminates the need for every broker node to search within the path label for that broker node's ID (or that broker node's link ID). This counter is incremented or decremented on every hop for interest and data object packets, respectively.

Packet forwarding may be done on every broker node by looking up the next hop as identified by the path label. In the case of labels based on forwarding tables, the correct table is consulted depending of the type of the packet, i.e. interest or data object packet. In the case of labels based on source routing, the next hop is identified by looking the succeeding or the preceding node (or link) ID in the label for interest and data packets, respectively.

Packet forwarding based on path labels provides more scalable routing in the datacenter compared to routing based on names. Furthermore, packet forwarding based on path labels enables the following capabilities that are not easily provided by "traditional" NDN routing:

(A) Failure Recovery—in the case of network failures, packets with a given path label have to be rerouted around the failed node or link. Changing the path label in the packet can do this. To change the path label, a broker node can consult a local table that provides backup paths for a given path. Alternatively, a broker node can request a replacement path label from the control node(s).

(B) Multipath Routing—in the case that a data object is present in more than one producer (or publisher), different parts of the object, corresponding to different names, can be retrieved from the different producers (or publishers). This can be achieved by assigning a different path label to the different interest packets corresponding to the different parts of the data object.

(C) Multicast Routing—in order to support multicast routing it is possible to extend the semantics of a path label to represent not only unicast paths, but multicast paths as well. That is, a label can, for example, represent a tree topology between a consumer and multiple producers, or a tree between a producer and multiple consumers.

Figure 3:
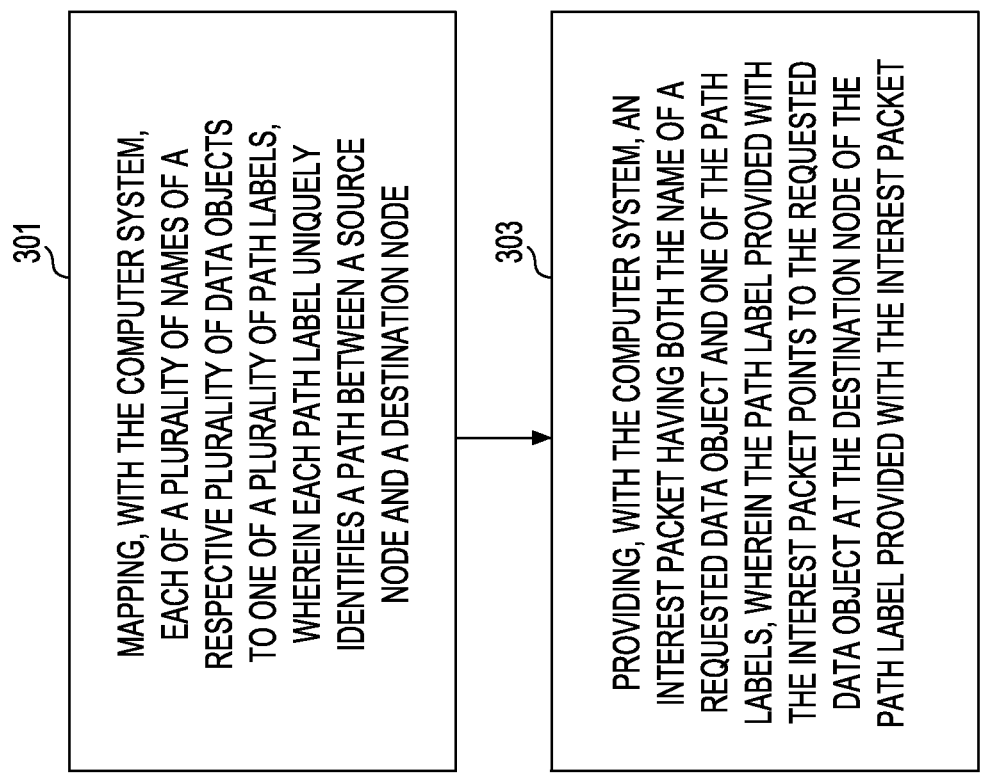
FIG. 3 depicts a flowchart of a method according to an embodiment of the present invention.

Referring now to FIG. 3, a method implemented in a computer system (or network) for routing at least one interest packet in a named data network including a plurality of nodes is shown. As seen in this FIG. 3, the method comprises: Step 301—mapping, with the computer system, each of a plurality of names of a respective plurality of the data objects to one of a plurality of path labels, wherein each path label uniquely identifies a path between a source node and a destination node; and Step 303—providing, with the computer system, an interest packet having both the name of a requested data object and one of the path labels, wherein the path label provided with the interest packet points to the requested data object at the destination node of the path label provided with the interest packet.

In one example, the mapping may be performed by one or more controllers.

In another example, the interest packet may be provided by a consumer node.

In another example, any steps may be carried out in the order recited or the steps may be carried out in another order.

Figure 4:
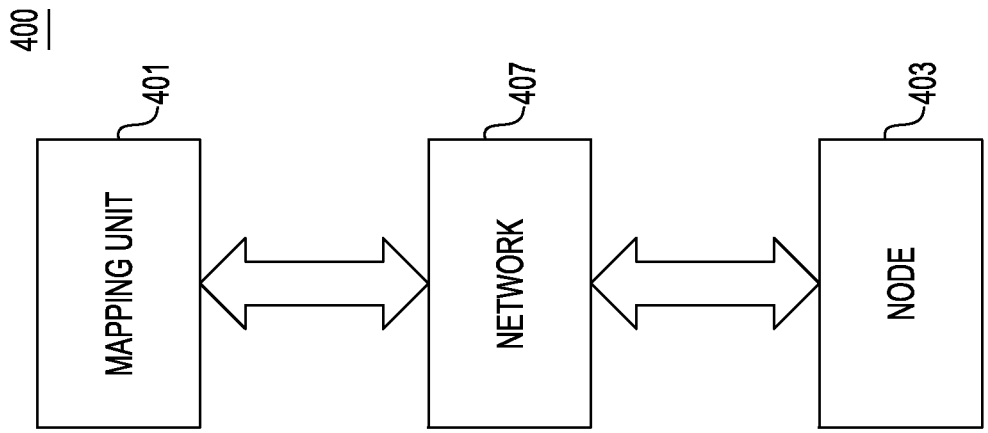
FIG. 4 depicts a block diagram of a system according to an embodiment of the present invention.

Referring now to FIG. 4, a computer-implemented system (or network) for routing at least one interest packet in a named data network including a plurality of nodes is shown. As seen in this FIG. 4, the system 400 includes: a mapping unit 401 configured for mapping each of a plurality of names of a respective plurality of data objects to one of a plurality of path labels, wherein each path label uniquely identifies a path between a source node and a destination node; and a node 403 in operative communication with the mapping unit configured for providing an interest packet having both the name of a requested data object and a given one of the path labels, wherein the path label provided with the interest packet points to the requested data object at the destination node of the path label provided with the interest packet.

Still referring to FIG. 4, any communications may be carried out via network 407. Network 407 may comprise the Internet, an intranet, a local area network, a wide area network and/or any other desired communication channel(s).

Figure 5:
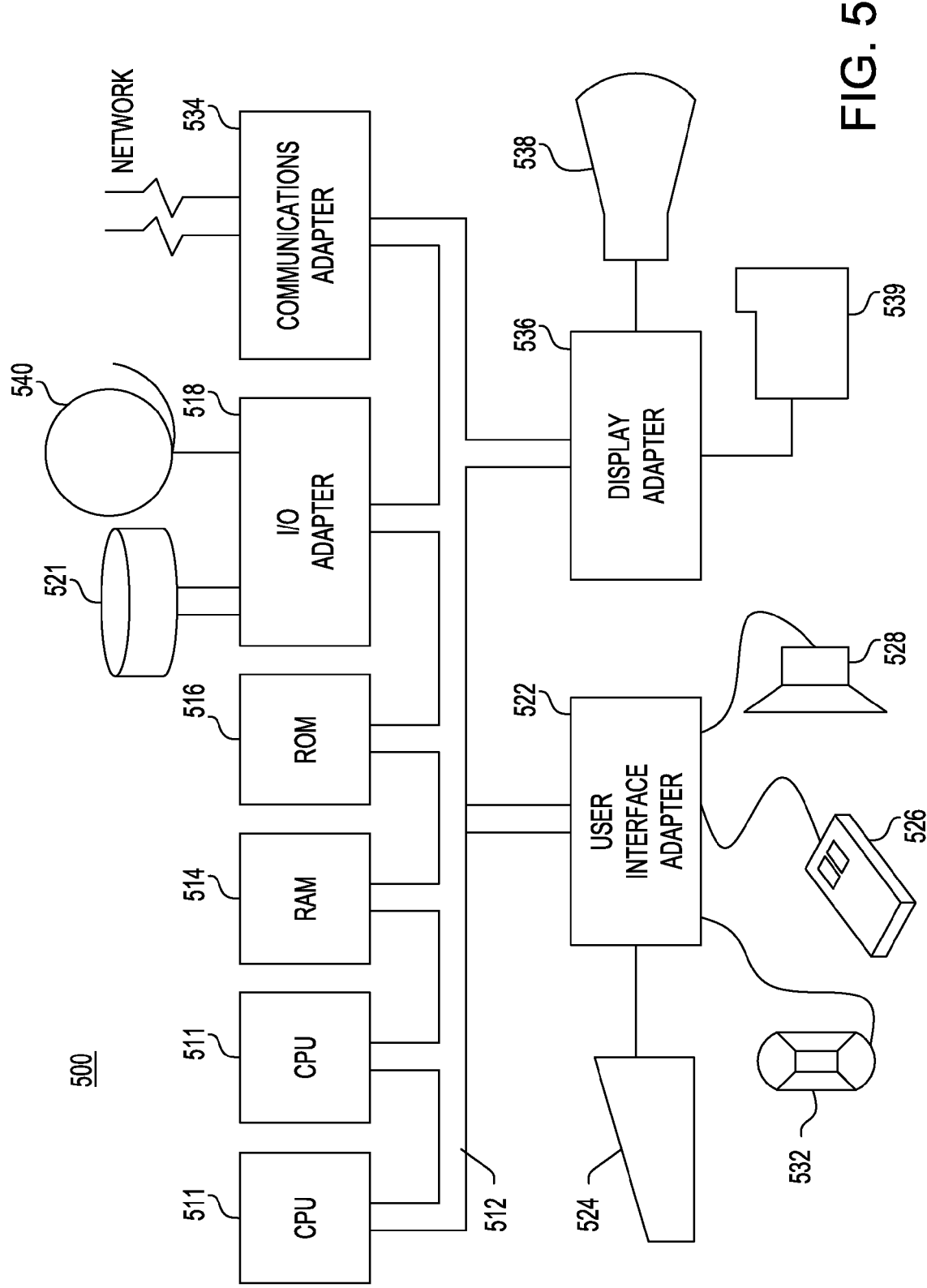
FIG. 5 depicts a block diagram of a system according to an embodiment of the present invention.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an Intranet, a local area network (LAN), etc., and a display adapter 536 for connecting the bus 512 to a display device 538 and/or printer 539 (e.g., a digital printer or the like).

In one embodiment, a method implemented in a computer system for routing at least one interest packet in a named data network including a plurality of nodes is provided, the method comprising: mapping, with the computer system, each of a plurality of names of a respective plurality of data objects to one of a plurality of path labels, wherein each path label uniquely identifies a path between a source node and a destination node; and providing, with the computer system, an interest packet having both the name of a requested data object and one of the path labels, wherein the path label provided with the interest packet points to the requested data object at the destination node of the path label provided with the interest packet.

In one example, the method further comprises: (a) receiving the interest packet at an intermediate node; (b) checking if the requested data object identified by the name in the interest packet is locally cached at the intermediate node; and (c) replying to the interest packet from the intermediate node if the requested data object identified by the name in the interest packet is locally cached at the intermediate node, wherein the intermediate node is a node on the path identified by the path label provided with the interest packet and the intermediate node is between the source node and the destination node.

In another example, the method further comprises forwarding the interest packet from the intermediate node to the destination node if the requested data object identified by the name in the interest packet is not locally cached at the intermediate node.

In another example, the path between a given pair of source and destination nodes includes at least one intermediate node.

In another example, the method further comprises assigning, from a plurality of possible path labels, an assigned path label to include in the interest packet.

In another example, the assigned path label is selected randomly.

In another example, the assigned path label is assigned based at least in part upon at least one of: a load of each of the possible paths associated with the possible path labels; and a capacity of each of the possible paths associated with the possible path labels.

In another example, the assigned path label is assigned such that for a given data object name the same path is always chosen for the same source node and destination node pair.

In another example, the assigned path label is assigned such that for a given data object name the path that converges to a previous path used for the same data object name is again used.

In another example, the mapping encodes each path label with a unique identifier for each respective path.

In another example, the mapping encodes each path label with a sequence of nodes for each respective path.

In another embodiment, a computer readable storage medium, tangibly embodying a program of instructions executable by the computer for routing at least one interest packet in a named data network including a plurality of nodes is provided, the program of instructions, when executing, performing the following steps: mapping each of a plurality of names of a respective plurality of data objects to one of a plurality of path labels, wherein each path label uniquely identifies a path between a source node and a destination node; and providing an interest packet having both the name of a requested data object and one of the path labels, wherein the path label provided with the interest packet points to the requested data object at the destination node of the path label provided with the interest packet.

In one example, the program of instructions, when executing, further performs the following: (a) receiving the interest packet at an intermediate node; (b) checking if the requested data object identified by the name in the interest packet is locally cached at the intermediate node; and (c) replying to the interest packet from the intermediate node if the requested data object identified by the name in the interest packet is locally cached at the intermediate node, wherein the intermediate node is a node on the path identified by the path label provided with the interest packet and the intermediate node is between the source node and the destination node.

In another example, the program of instructions, when executing, further performs the following: forwarding the interest packet from the intermediate node to the destination node if the requested data object identified by the name in the interest packet is not locally cached at the intermediate node.

In another example, the path between a given pair of source and destination nodes includes at least one intermediate node.

In another example, the program of instructions, when executing, further performs the following: assigning, from a plurality of possible path labels, a selected path label to include in the interest packet.

In another example, the assigned path label is selected randomly.

In another example, the assigned path label is assigned based at least in part upon at least one of: a load of each of the possible paths associated with the possible path labels; and a capacity of each of the possible paths associated with the possible path labels.

In another example, the assigned path label is assigned such that for a given data object name the same path is always chosen for the same source node and destination node pair.

In another example, the assigned path label is assigned such that for a given data object name the path that converges to a previous path used for the same data object name is again used.

In another example, the mapping encodes each path label with a unique identifier for each respective path.

In another example, the mapping encodes each path label with a sequence of nodes for each respective path.

In another embodiment, a computer-implemented system for routing at least one interest packet in a named data network including a plurality of nodes is provided, the system comprising: a mapping unit configured for mapping each of a plurality of names of a respective plurality of the data objects to one of a plurality of path labels, wherein each path label uniquely identifies a path between a source node and a destination node; and a node in operative communication with the mapping unit configured for providing an interest packet having both the name of a requested data object and one of the path labels, wherein the path label provided with the interest packet points to the requested data object at the destination node of the path label provided with the interest packet.

In one example, the system further comprises: an intermediate node, wherein intermediate node is configured for checking if the requested data object identified by the name in the interest packet is locally cached at the intermediate node and replying to the interest packet if the requested data object identified by the name in the interest packet is locally cached at the intermediate node, wherein the intermediate node is a node on the path identified by the path label provided with the interest packet and the intermediate node is between the source node and the destination node.

In another example, the intermediate node is configured for forwarding the interest packet from the intermediate node to the destination node if the requested data object identified by the name in the interest packet is not locally cached at the intermediate node.

In another example, the path between a given pair of source and destination nodes includes at least one intermediate node.

In another example, the system further comprises assigning, from a plurality of possible path labels, a selected path label to include in the interest packet.

In another example, the assigned path label is assigned randomly.

In another example, the assigned path label is assigned based at least in part upon at least one of: a load of each of the possible paths associated with the possible path labels; and a capacity of each of the possible paths associated with the possible path labels.

In another example, the assigned path label is assigned such that for a given data object name the same path is always chosen for the same source node and destination node pair.

In another example, the assigned path label is assigned such that for a given data object name the path that converges to a previous path used for the same data object name is again used.

In another example, the mapping encodes each path label with a unique identifier for each respective path.

In another example, the mapping encodes each path label with a sequence of nodes for each respective path.

As described herein, routing of named data objects within a datacenter may be done based on a fixed number of labels, with each label representing a path between a source node and a destination node. Names may be mapped to path labels in a way that preserves the main properties of NDN (e.g., data location independence, data caching) while enabling scalable routing within the datacenter.

Figure 6:
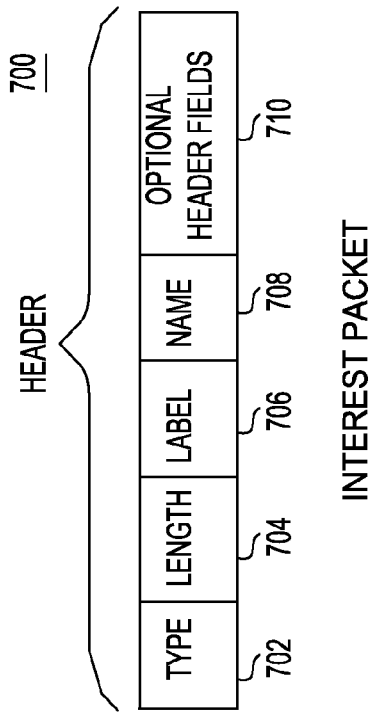
FIG. 6 depicts a flowchart of a method according to an embodiment of the present invention.

More specifically, given that the number of paths between content consumers and producers in a datacenter is finite, each possible path can be given a path label. Data interests, sent from consumers to producers, as well as data responses, sent from producers to consumers, may be forwarded based on path labels. In one example, path labels can encode the actual paths (e.g., by using source routing) and/or the path labels can be distributed (e.g., in all datacenter/network nodes) as static forwarding tables that provide a mapping between path labels to next-hop nodes. On every hop (see Step 601 of FIG. 6), nodes may first check whether an interest packet can be locally served from the cache of the node at that hop, by looking if the data object of the name present in the interest packet is locally cached at the node at that hop, and if not (see Step 603 of FIG. 6), the node may forward the interest packet to the next node by looking at the path label of the interest packet.

One advantage of this mechanism is that it enables scalable forwarding based on names within a datacenter. In this regard: (a) the forwarding tables become much smaller, with a total size depending only on the total number of paths in the datacenter (vs the total number of names in the conventional named based routing); (b) the lookup process becomes faster, as only exact matches for labels and names are required (vs longest prefix matches in the conventional named based routing). In addition, as described herein, various names-to-labels mapping mechanisms as well as various routing mechanisms can be used in order to enable multipath routing, failure recoveries and to improve cache hit rates, in a way more efficient than conventional NDN routing protocols.

As described herein, in various embodiments mechanisms for performing named data routing comprising the following steps are provided: (a) mapping the name of data to a path label that uniquely identifies a path between a source node and a destination node; (b) including in an interest packet both the name of the data and the path label between the source node and the destination node; (c) replying to the interest packet if the data identified by the name in the packet is already locally cached; and (if the interest packet has not been replied to) forwarding the interest packet on to the next hop node based on the path information provided by the path label).

In other examples, implementation may be in the context of: (a) converged communications (network equipment); (b) converged communications (protocols—network or other); and/or software (system software).

In other examples, routing for a given named data object may be done on pre-determined path(s).

In other examples, labels and or names may be embedded in one or more packet headers.

In other examples, a physical path may be associated with a data object name in an NDN.

As described herein, various embodiments provide for routing based on a combination of path labels and data names.

As described herein, in various embodiments, speed and efficiency of NDN routing may be improved.

As described herein, in various embodiments, a mechanism for scalable routing in named data networks is provided. Of note, the mode of communication in named data networks is different from the one in, for example, publish/subscribe networks. The former typically follows a request/response model while the latter typically follows a push model (or alternatively, typically a unicast and typically a multicast communication model, respectively).

In this regard, as described herein, label based forwarding (to the appropriate destination) may be applied both to the interest packet and the named data object packet. This architecture scales both the discovery and the dissemination of the data (in particular, for named data networks where interest packets are generated much more frequently compared to subscription requests in publish/subscribe networks).

As described herein, the concept of label based forwarding and data caching may be combined. This combination, as described herein, enables new types of routing algorithms that can choose paths based on the cached content, which can further increase the scalability of named data networks.

As described herein, data caching that enables scalable dissemination in multicast type communications may be provided (both in the case that data requests for the different receivers are concurrent as well as spread across time).

As described herein, various embodiments may: (a) generate unique path labels for all paths between source node and destination node pairs; and (b) dynamically assign a path label to each interest packet associated with a given requester and a responder node.

In one example, packets are forwarded based on the path labels rather than the names of the data object.

In another example, for each destination, multiple labels are used to facilitate load balancing across all network links.

In another example, the path between the source node and the destination node may include a plurality of intermediate nodes.

In another example, each of the nodes comprises at least one of: (a) a router; and (b) a switch.

In another example, multiple names may be assigned to a given one of the path labels.

In another example, a path label may be selected such that for a given data object name the path that converges to an immediately previous path used for the same data object name is again used.

In another example, for each name, proper assignment of path labels is used to increase the cache hit probabilities.

In various embodiments, benefits may include one or more of the following: (a) small tables: forwarding is done based on a 'finite' number of path labels (typically much smaller than the number of data object names); (b) exact matching: forwarding typically is faster given that only exact match operations are needed (both for names and the path labels); (c) zero flooding: all packets are forwarded in a unicast manner (no need to flood packets for unknown destinations); (d) load balancing: 'smart' path assignment enables even distribution of load across all data center links/nodes; and/or (e) data caching: 'smart' path assignment improves the chances of hitting cached data along the assigned path.

In various embodiments, load-balanced routing may be provided. That is, for a given source node and destination node pair, different paths are used for the different data names stored on the destination node. In one specific example, a random assignment of paths is used (that is, from all the available paths between a source node and a destination node one of the available paths is chosen at random). In another specific example, a metric-based assignment of paths is used (that is, based on the load and/or the capacity of the available paths, select the appropriate path (e.g., path with the lowest load and/or highest capacity)).

In various embodiments, cache-aware routing may be provided. That is, among the multiple paths that exist between the requester node and the data-holding node, a path is chosen in a way that increases the chance of finding the requested data cached along the way. In one example, consistent-hashing routing is used (that is, for a given data name the same path is always chosen for the same source node and destination node pair). In another example, history-based routing may be used (that is, for a given name the path that converges the fasted to the last path used for the same name is assigned). Based on historical data, all nodes that have been involved in serving the last request of a given name are identified. Then, for example any new request for the same name will be assigned a path label than includes the maximum number of the previous involved nodes.

In various embodiments, path-label encoding may be provided. That is, the path label can encode the path information in various ways. In one specific example, the path label can encode the path information using a label table. With such a label table, each path in the data center takes a unique label (e.g., a number, an alphanumeric identifier). All nodes in the data center are prepopulated with tables that provide the next hop node (if given a particular path label).

In another specific example, the path label can encode the path information using source routing: with such source routing, the path label encodes the actual path as a sequence of NDN nodes (or links). Each node then finds the next hop by looking at the node (or link) after it in the path label.

As described herein, one difference between various embodiments and a conventional DNS is that a DNS provides a mapping between a name and a destination's IP address while various embodiments provide a mapping between a name and a path. This latter approach is more flexible as exact path or paths can be selected that can reach a destination, something that is not typically possible in a conventional DNS. Benefits include finer control on the location of the cached objects, on multipath routing and on load balancing (as compared to the conventional DNS approach).

As described herein, one difference between various embodiments and conventional MPLS is that various embodiments provide an additional mapping between names and paths, and enable a packet to carry with it both the path label information and the name information. This allows various embodiments to do routing based on predetermined paths while at the same time taking advantage of cached content (a feature not typically present in conventional MPLS).

Figure 7A:
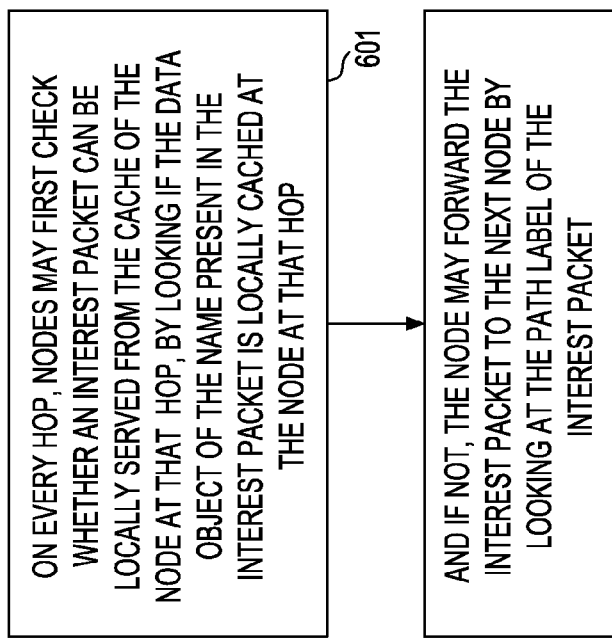
FIG. 7A depicts an example block diagram of an interest packet structure according to an embodiment of the present invention.

Referring now to FIG. 7A, an example block diagram of an interest packet structure according to an embodiment is depicted. As seen, in this example, interest packet 700 may comprise a header including type 702, length 704, label 706, name 708 and optional header fields 710.

Figure 7B:
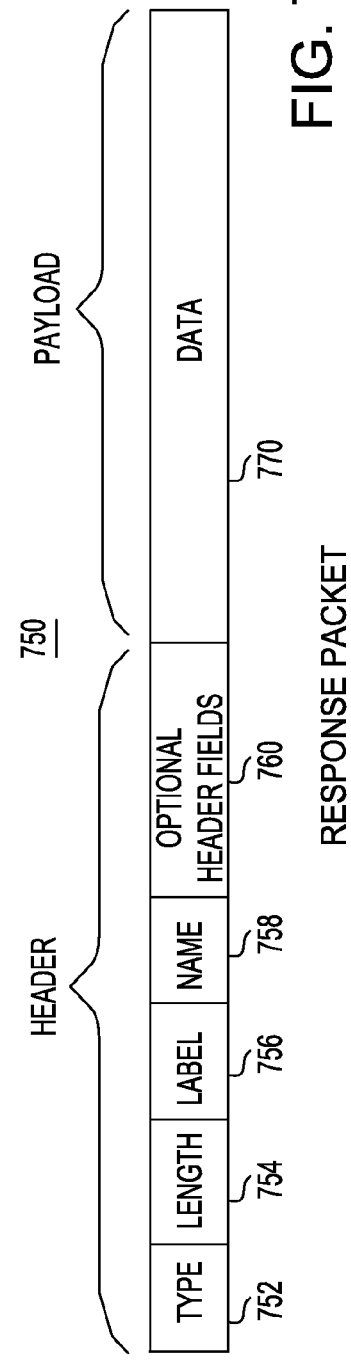
FIG. 7B depicts an example block diagram of a response packet structure according to an embodiment of the present invention.

Referring now to FIG. 7B, an example block diagram of a response packet structure according to an embodiment is depicted. As seen, in this example, response packet 750 may comprise a header and a payload. The header may include type 752, length 754, label 756, name 758 and optional header fields 760. The payload may include data 770.

In another example, a label may be a fixed-length label.

In another example, various embodiments may be used in the context of at least one cellular communications network.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A non-transitory computer readable storage medium, tangibly embodying a program of instructions executable by the computer for routing at least one interest packet in a named data network including a plurality of nodes, the program of instructions, when executing, performing the following steps:
   mapping each of a plurality of names of a respective plurality of data objects to one of a plurality of path labels, wherein each path label uniquely identifies a path between a source node and a destination node;
   providing an interest packet having both the name of a requested data object and one of the path labels, wherein the path label provided with the interest packet points to the requested data object at the destination node of the path label provided with the interest packet;
   receiving the interest packet at an intermediate node, the intermediate node being a node on the path identified by the path label provided with the interest packet and the intermediate node is between the source node and the destination node;
   checking if the requested data object identified by the name in the interest packet is locally cached at the intermediate node;
   replying to the interest packet from the intermediate node if the requested data object identified by the name in the interest packet is locally cached at the intermediate node; and
   forwarding the interest packet from the intermediate node to the destination node if the requested data object identified by the name in the interest packet is not locally cached at the intermediate node.

2. The non-transitory computer readable storage medium of claim 1, wherein the mapping encodes each path label with a unique identifier for each respective path.

3. The non-transitory computer readable storage medium of claim 1, wherein the mapping encodes each path label with a sequence of nodes for each respective path.

4. The non-transitory computer readable storage medium of claim 1, wherein the path between a given pair of source and destination nodes includes at least one intermediate node.

5. The non-transitory computer readable storage medium of claim 1, wherein the program of instructions, when executing, further performs the following: assigning, from a plurality of possible path labels, an assigned path label to include in the interest packet.

6. The non-transitory computer readable storage medium of claim 5, wherein the assigned path label is selected randomly.

7. The non-transitory computer readable storage medium of claim 5, wherein the assigned path label is assigned based at least in part upon at least one of:
   a load of each of the possible paths associated with the possible path labels; and
   a capacity of each of the possible paths associated with the possible path labels.

8. The non-transitory computer readable storage medium of claim 5, wherein the assigned path label is assigned such that for a given data object name the same path is always chosen for the same source node and destination node pair.

9. The non-transitory computer readable storage medium of claim 5, wherein the assigned path label is assigned such that for a given data object name the path that converges to a previous path used for the same data object name is again used.

10. A computer-implemented system for routing at least one interest packet in a named data network including a plurality of nodes, the system comprising:
    a mapping unit configured for mapping each of a plurality of names of a respective plurality of the data objects to one of a plurality of path labels, wherein each path label uniquely identifies a path between a source node and a destination node;
    a node in operative communication with the mapping unit configured for providing an interest packet having both the name of a requested data object and one of the path labels, wherein the path label provided with the interest packet points to the requested data object at the destination node of the path label provided with the interest packet;
    an intermediate node receiving the interest packet, the intermediate node being a node on the path identified by the path label provided with the interest packet and the intermediate node is between the source node and the destination node;
    the intermediate node checking if the requested data object identified by the name in the interest packet is locally cached at the intermediate node;
    the intermediate node replying to the interest packet if the requested data object identified by the name in the interest packet is locally cached at the intermediate node; and
    the intermediate node forwarding the interest packet to the destination node if the requested data object identified by the name in the interest packet is not locally cached at the intermediate node.

11. The system of claim 10, wherein the path between a given pair of source and destination nodes includes at least one intermediate node.

12. The system of claim 10, wherein the mapping encodes each path label with a unique identifier for each respective path.

13. The system of claim 10, wherein the mapping encodes each path label with a sequence of nodes for each respective path.

14. The system of claim 10, wherein an assigned path label to include in the interest packet is assigned from a plurality of possible path labels.

15. The system of claim 14, wherein the assigned path label is assigned such that for a given data object name the same path is always chosen for the same source node and destination node pair.

16. The system of claim 14, wherein the assigned path label is assigned such that for a given data object name the path that converges to a previous path used for the same data object name is again used.

17. The system of claim 14, wherein the assigned path label is assigned randomly.

18. The system of claim 14, wherein the assigned path label is assigned based at least in part upon at least one of:
- a load of each of the possible paths associated with the possible path labels; and
- a capacity of each of the possible paths associated with the possible path labels.

* * * * *